United States Patent
Damm et al.

(10) Patent No.: US 6,582,339 B2
(45) Date of Patent: Jun. 24, 2003

(54) WHEEL DRIVE WITH INTEGRATED DYNAMIC SERVICE BRAKE

(75) Inventors: Horst Damm, Sprockhovel (DE); Wolfgang Dornhege, Lunen (DE)

(73) Assignee: Lohmann & Stolterfoht GmbH (DE)

( * ) Notice: Subject to any disclaimer, the term of this patent is extended or adjusted under 35 U.S.C. 154(b) by 0 days.

(21) Appl. No.: 09/887,515

(22) Filed: Jun. 22, 2001

(65) Prior Publication Data

US 2002/0045510 A1 Apr. 18, 2002

(30) Foreign Application Priority Data

Jun. 22, 2000 (DE) .......................... 100 30 441

(51) Int. Cl.[7] ............................................. F16H 47/00
(52) U.S. Cl. ..................... 475/317; 180/372; 192/221.1
(58) Field of Search .......................... 475/317; 180/372; 188/71.5, 106 P, 106 A; 192/221.1

(56) References Cited

U.S. PATENT DOCUMENTS 4,271,725 A * 6/1981 Takao et al. ................ 475/331
4,540,073 A * 9/1985 Rogier ....................... 188/71.5
4,562,903 A * 1/1986 Rogier ...................... 188/18 A

FOREIGN PATENT DOCUMENTS

DE 299 10 017 UI 9/1999
EP 684 401 11/1995

* cited by examiner

Primary Examiner—Saul Rodriguez
Assistant Examiner—Dennis Abdelnour
(74) Attorney, Agent, or Firm—Reed Smith LLP; Michael I. Wolfson

(57) ABSTRACT

In order to achieve a repair-friendly and maintenance-friendly arrangement with improved conduction away of heat to the outside in a wheel drive, in particular for mobile machines, having a carrying axle (2) which is mounted fixed in terms of rotation to the vehicle frame (1) and which is rotatably connected as a wheel hub to a ring gear (4) via a roller bearing arrangement (3a, 3b), the ring gear (4) being driven via at least one planetary gear mechanism (24) with drive-end sun wheel (16), and an integrated dynamic service brake (24) being provided between the ring gear (4) and the carrying axle (2), it is proposed that the service brake (24) be arranged within the ring gear (4) at the end directly behind a detachable gear mechanism cover (11) and at the outer radius on a hollow-cylinder-shaped brake carrier (10) which forms the end piece of the carrying axle (2) which is fixed in terms of rotation, and that the planetary gear mechanism (34) be arranged behind the service brake (24), viewed from the end, within the ring gear (4).

11 Claims, 1 Drawing Sheet

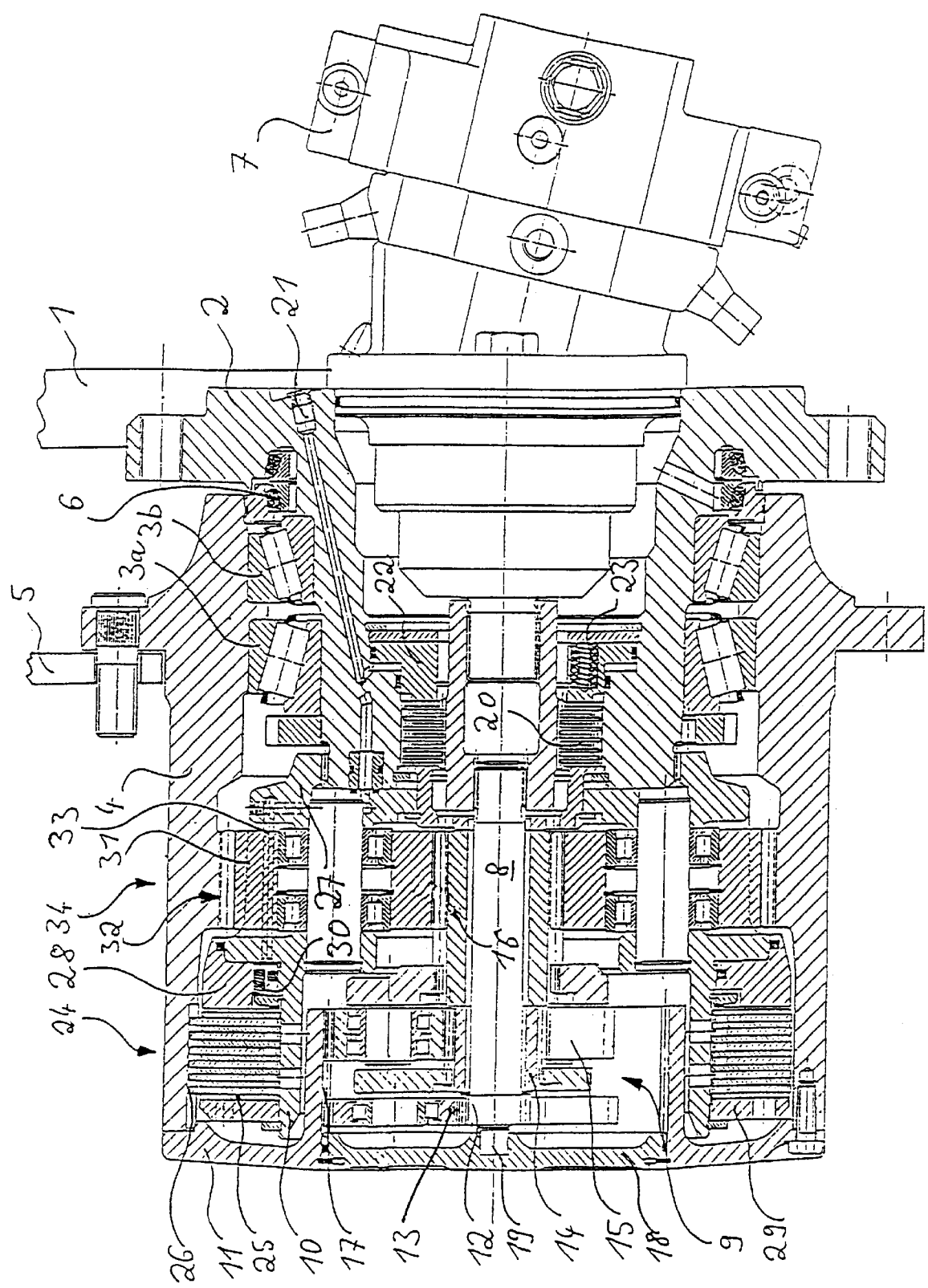

WHEEL DRIVE WITH INTEGRATED DYNAMIC SERVICE BRAKE

BACKGROUND OF THE INVENTION

The invention relates to a wheel drive, in particular for mobile machines, having an integrated dynamic service brake.

Mobile machines, such as fork-lift trucks, forest machines, agricultural machines, etc., are usually moved at speeds of up to 40 km/h. A high degree of manoeuvrability is required with such machines. For these reasons, it has become customary for mobile machines to have direct wheel drives, as opposed to a central drive in which the driving force is transmitted to a pair of wheels. Because the mobile machines of the type in question here already have a hydraulic circuit for moving their working equipment, an adjustable hydraulic motor, which can advantageously be operated with the existing hydraulic circuit, is preferably used as the drive element in the wheel drive.

A wheel drive of the generic type is known from DE 299 10 017 U1. The wheel drive has a carrying axle which is funnel-shaped in the region near to the vehicle and is attached fixed in terms of rotation to the frame of a vehicle. On the carrying axle there is a wheel hub which is mounted so as to be capable of rotating by means of roller bearings. The vehicle wheel can be attached to the wheel hub. The wheel hub is driven by a drive shaft running in the centre of the carrying axle, via a planetary gear mechanism which reduces the rotational speed. The planetary gear mechanism is therefore connected at the input end via its central sun wheel to the drive shaft. At the output end, the planetary wheels are connected directly to the wheel hub, which forms the planetary carrier here.

A dynamic service brake for the wheel drive acts via the outer ring gear of the planetary gear mechanism. The dynamic service brake is embodied as a multidisc brake whose stationary discs are connected to the wheel hub and whose moving discs are connected to the ring gear of the planetary gear mechanism via a ring-carrier. Braking while the wheel drive is operating is carried out by applying pressure medium to a piston which presses the stationary and moving brake discs axially one against the other in order to bring about effective braking of the vehicle, there being an arrangement of alternating stationary and moving discs.

The heat produced during the braking operation is conveyed into the oil bath and conducted away to the outside via the wheel hub. Because of the arrangement of the dynamic service brake at the outer radius in the centre of the wheel hub, the maximum generation of heat occurs in the region where the vehicle wheel is attached. In this region, the conduction of heat away to the outside is unfavourable, that when the service brake experiences extreme stressing the entire wheel drive may overheat. Furthermore, it is disadvantageous that when the wheel drive is serviced or repaired it is necessary to completely dismount the planetary casing. This is possible only when the vehicle wheel has previously been dismantled.

A further wheel drive is known from EP 0 684 401 B1. In contrast to the wheel drive described above, a disc brake is used here as the dynamic service brake. However, the brake disc of the disc brake with its brake shoes which can be activated hydraulically are also arranged in the centre of the wheel drive so that the heat generated by the service brake cannot easily be conducted away to the outside. The planetary gear mechanism for transmitting the driving force from the drive shaft to the wheel hub is also placed at the distal end of the wheel drive here. For servicing and repair purposes, the dynamic service brake and the planetary gear mechanism are also only accessible when the wheel is removed and the pot-shaped housing cap dismounted.

SUMMARY OF THE INVENTION

The object of the present invention is to improve further the wheel drive of the generic type to the effect that service-friendly and repair-friendly access to the essential components of the brake and gear mechanism is possible and the risk of overheating of the wheel drive during operation is minimized.

The invention includes the technical teaching that the dynamic service brake of a wheel drive is arranged within the ring gear forming the wheel hub, at the end directly behind a detachable gear mechanism cover and at the outer radius on a hollow-cylinder-shaped brake carrier forming the end piece with carrying axles which are fixed in terms of rotation, the planetary gear mechanism of the service brake being arranged within the ring gear following in the direction of the vehicle frame.

The arrangement according to the invention of the brake components and the mechanism components of the wheel drive is made possible by means of the specific configuration of the brake carrier which represents a prolongation of the carrying axle which is fixed in terms of rotation. As a result, the service brake extends to the distal end of the wheel drive. At this point, as a result of the slipstream, there is improved conduction away of heat directly in the region of the wheel drive in which the braking heat is generated, resulting in improvement to the cooling of the wheel drive. Because the wheel drive is sealed off by means of a flat, end-mounted gear mechanism cover, simple accessibility of the essential components when performing servicing or repairs is ensured. There is no need to remove the vehicle wheel for this purpose.

In order to ensure a space-saving gear mechanism function of the planetary gear mechanism within the wheel drive, the drive-end sun wheel preferably engages with planetary wheels which are secured fixed in terms of rotation to the carrying axle by means of planetary bolts. The planetary wheels roll in turn on an inner toothing which is provided directly on the inner radius of the ring gear.

It is also possible to provide a further preliminary stage of the gear mechanism within the wheel drive in order to convert a desired transmission ratio appropriately for the loading. Preferably, at least one preliminary stage of the gear mechanism is positioned within the hollow-cylinder-like brake carrier, directly behind the detachable gear mechanism cover and thus also in an easily accessible location. The preliminary stage of the gear mechanism is connected at the input end to the drive shaft of the wheel drive and at the output end to the sun wheel of the (main) planetary gear mechanism which is connected downstream in this respect. The preliminary stage of the gear mechanism may be embodied as a single-stage or multistage preliminary planetary gear mechanism. Because of its coaxial design, the arrangement as a planetary gear mechanism is particularly suitable for this. For example, the ring gear of a single-stage preliminary planetary gear mechanism can easily be embodied by means of the gear mechanism cover so as to be fixed in terms of rotation with respect to the ring gear, forming the wheel rim, of the (main) planetary gear mechanism. Due to this, the ring gear of the preliminary stage of the gear mechanism is fitted with at least one or two planetary wheel sets. These planetary wheel sets are preferably arranged behind a separate cover which is arranged coaxially in the gear mechanism cover and which also forms a securing means for the entire drive shaft of the wheel drive.

In addition to the service brake which is activated while travelling, a second brake may also be provided at the input end on the drive shaft, said second brake performing the function of a hand brake, that is to say the function of keeping the vehicle stationary when it is parked.

The invention accordingly comprises the features of construction, combination(s) of elements, and arrangement of parts which will be exemplified in the construction(s) hereinafter set forth, and the scope of the invention will be indicated in the claims.

BRIEF DESCRIPTION OF THE DRAWING

For a fuller understanding of the invention, reference is had to the following description taken in connection with the accompanying drawing(s), in which:

The sole FIGURE is an axial cross-section through a wheel drive constructed and arranged in accordance with the invention.

DESCRIPTION OF THE PREFERRED EMBODIMENTS

The dynamic service brake and the hand brake are preferably embodied in the manner of a multidisc brake. In the case of the service brake, the stationary brake discs are connected to the end piece of the carrying axle which is fixed in terms of rotation, and the rotating brake discs are connected to the ring gear. Both types of brake discs are arranged alternately in the manner of a package. In order to activate the service brake, a brake piston is provided which can be activated hydraulically and whose pressure medium duct advantageously runs at least partially through the carrying axle in the direction of the vehicle frame. The design of and the way of activating the hand brake may be analogous. The service brake is preferably activated by the brake piston counter to the restoring force of a compression spring. Instead of the multidisc brake described above, it is also conceivable to use a different type of brake—for example a disc brake—as service brake and/or as hand brake, if the structural peripheral conditions necessary for this are fulfilled.

Further measures which improve the invention are illustrated in more detail below together with the description of a preferred exemplary embodiment of the invention with reference to the drawing. The single FIGURE shows an axial section through a wheel drive according to the invention.

The funnel-shaped carrying axle 2 of a wheel drive is attached fixed in terms of rotation to a vehicle frame 1 (not illustrated in more detail here) by means of bolts. Above a roller bearing arrangement 3a, 3b which is composed of two tapered roller bearings, a ring gear 4 is rotatably mounted on the carrying axle 2. The ring gear 4 serves directly as a wheel hub for a vehicle wheel 5 which is bolted thereon. The rotatable ring gear 4 is sealed with respect to the rotationally fixed carrying axle 2 by means of a sealing arrangement 6.

In order to drive the vehicle wheel 5, a hydraulic adjustment motor 7 is provided which is connected to the pressure medium circuit of the vehicle. The rotary movement generated by the hydraulic motor 7 is initially transmitted to a preliminary stage 9 of the gear mechanism which is embodied as a planetary gear mechanism, via a coaxial drive shaft 8 which runs within the hollow carrying axle 2. The preliminary stage 9 of the gear mechanism is of two-stage design in this exemplary embodiment. The preliminary stage 9 of the gear mechanism is positioned within a hollow-cylinder-like brake carrier 10 which forms the continuation of the carrying axle 2 which is fixed in terms of rotation, directly behind a detachable gear mechanism cover 11.

The input-end drive shaft 8 leads into a sun wheel 12 of the first preliminary stage of the gear mechanism. The planetary wheels 13 which engage with the sun wheel 12 are connected to the sun wheel 14 of the second gear-mechanism preliminary stage. The planetary wheels 15 of said preliminary stage are, in turn, connected to the sun wheel 16 of the (main) planetary gear mechanism.

In order to close the power flux within the two preliminary planetary stages, a common ring gear 17 is provided which is of integral construction with the gear mechanism cover 11. The planetary sets 13 and 15 of the two preliminary stages of the gear mechanism are directly accessible behind a separate cover 18 which is arranged coaxially in the gear-mechanism cover 11 and which also forms an end-side bearing point 19 for the drive shaft 8.

A hand brake 20, which ensures the vehicle wheel 5 is locked when the vehicle is stationary is provided in the front region of the drive shaft 8. For this purpose, the hand brake 20 which is embodied as a multidisc brake acts between the carrying axle 2 and the drive shaft 8. The hand brake 20 is activated by means of the force of a brake spring 23, the hand brake 20 being held hydraulically in the open position by means of the piston 22 via a pressure medium duct 21.

In addition to the hand brake 20, a dynamic service brake 24 is provided, which can be activated during travel in order to perform braking. The dynamic service brake 24 is accessible from outside within the ring gear 4, directly behind the detachable gear mechanism cover 11. Stationary brake discs 25 of the service brake 24 are connected to the brake carrier 10 which forms the end piece of the carrying axle 2 which is fixed in terms of rotation. On the other hand, the rotating brake discs 26 are connected to the ring gear 4. The brake carrier 10 then forms a common part with a planetary carrier 27 and is connected fixed in terms of rotation to the carrying axle 2 via an axial toothing and is held there axially with a securing ring. The activating force for the dynamic service brake 24 is provided by a brake piston 28 which can be moved hydraulically counter to a pressure plate 29 and assumes its home position by means of restoring springs 30.

The planetary gear mechanism 34 which forms the main gear mechanism is provided behind the dynamic service brake 24, viewed from the end. Said planetary gear mechanism is composed of the sun wheel 16, the planetary wheels 31 and an inner toothing 32, as ring gear, arranged on the inner radius of the ring gear 4. The planetary gear mechanism 34 is driven thus by means of the ring gear 4.

The invention is not restricted to the preferred exemplary embodiment as described above. It is instead also possible to conceive of refinements thereof which make use of the invention even with a fundamentally different configuration. In particular, the invention is not restricted to the two-stage preliminary gear mechanism described above. It is also conceivable for the wheel drive to be equipped without a preliminary gear mechanism or to be equipped with just a single-stage preliminary gear mechanism. This measure is dependent solely on the desired transmission ratio which can be correspondingly configured in an optimum way in terms of the loading.

LIST OF REFERENCE NUMERALS

1 Vehicle frame
2 Carrying axle

3 Roller bearing arrangement
4 Ring gear
5 Vehicle wheel
6 Sealing arrangement
7 Hydraulic adjustment motor
8 Drive shaft
9 Preliminary stage of gear mechanism
10 Brake carrier
11 Gear mechanism cover
12 Sun wheel
13 Planetary wheel
14 Sun wheel
15 Planetary wheel
16 Sun wheel
17 Ring gear
18 Cover
19 Bearing point
20 Hand brake
21 Pressure medium duct
22 Piston
23 Brake spring
24 Service brake
25 Brake disc, stationary
26 Brake disc, rotating
27 Planetary carrier
28 Piston
29 Pressure plate
30 Restoring spring
31 Planetary wheel
32 Toothing
33 Pressure medium duct
34 Planetary gear mechanism It will thus be seen that the objects set forth above, among those made apparent from the preceding description, are efficiently attained and, since certain changes may be made in the above construction(s) without departing from the spirit and scope of the invention, it is intended that all matter contained in the above description or shown in the accompanying drawing(s) shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A wheel drive for mobile machines with a vehicle frame, having a carrying axle which is mounted fixed in terms of rotation to the vehicle frame and a motor with a drive shaft, the axle rotatably connected as a wheel hub to a ring gear via a roller bearing arrangement, the ring gear being driven via at least one planetary gear mechanism with drive-end sun wheel, and an integrated dynamic service brake being provided between the ring gear and the carrying axle, comprising the service brake is arranged within the ring gear at the end directly behind a detachable gear mechanism cover and at the outer radius on a hollow-cylinder-shaped brake carrier which forms the end piece of the carrying axle which is fixed in terms of rotation, and in that the planetary gear mechanism is arranged behind the service brake, viewed from the end, within the ring gear; and a gear mechanism including at least one preliminary stage which is connected at the input end to the drive shaft and at the output end to the sun wheel of the planetary gear mechanism and positioned within the hollow-cylinder-shaped brake carrier, directly behind the detachable gear mechanism cover.

2. The wheel drive according to claim 1, characterized in that the drive-end sun wheel (16) of the planetary gear mechanism (34) is engaged with planetary wheels (31) which are secured fixedly to the carrying axle (2) by means of planetary bolts and which roll on an inner toothing on the ring gear (4).

3. The wheel drive according to claim 1, characterized in that the preliminary stage (9) of the gear mechanism is embodied as a single-stage or dual-stage preliminary planetary gear mechanism.

4. The wheel drive according to claim 3, characterized in that the/a ring gear (17) of the preliminary stage (9) of the gear mechanism is embodied, by means of the gear mechanism cover (11), so as to be fixed in terms of rotation with respect to the ring gear (4) which forms the wheel hub.

5. The wheel drive according to claim 3, characterized in that the ring gear (17) of the preliminary stage (9) of the gear mechanism is fitted with at least one or two planetary wheel sets (13, 15).

6. The wheel drive according to claim 5, characterized in that the planetary sets (13, 15) are arranged behind a separate cover (18) which is arranged coaxially in the gear mechanism cover (11) and which forms a bearing point (19) for the drive shaft (8).

7. The wheel drive according to claim 1, characterized in that a hand brake (20) which is operatively connected to the hollow carrying axle (2) is provided on the input-end drive shaft (8).

8. The wheel drive according to claim 1, characterized in that the service brake (24) is embodied in the manner of a multidisc brake with alternately arranged brake discs (25, 26), the multidisc brake discs (25) of said multidisc brake being connected to the end piece of the carrying axle (2) which is fixed in terms of rotation and the rotating brake discs (26) of said multidisc brake being connected to the ring gear (4).

9. The wheel drive according to claim 8, characterized in that, in order to activate a brake piston (28) of the service brake (24), a pressure medium duct (33) which runs at least partially through the carrying axle (2) of the planetary gear mechanism (34) in the direction of the vehicle frame (1) is provided.

10. The wheel drive according to claim 9, characterized in that the pressure medium which is introduced through the pressure medium duct (33) activates a brake piston (28) counter to the restoring force of a compression spring (30).

11. The wheel drive according to claim 1, characterized in that the hollow-cylinder-shaped brake carrier (10) which forms the end piece of the carrying axle (2) which is fixed in terms of rotation is embodied in one piece or as multiple parts with the carrying axle (2).

* * * * *